(12) United States Patent
Takahashi et al.

(10) Patent No.: US 11,487,298 B2
(45) Date of Patent: Nov. 1, 2022

(54) IMAGE PROCESSING DEVICE

(71) Applicant: SUBARU CORPORATION, Tokyo (JP)

(72) Inventors: Naoki Takahashi, Tokyo (JP); Junichi Asako, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 223 days.

(21) Appl. No.: 17/060,318

(22) Filed: Oct. 1, 2020

(65) Prior Publication Data

US 2021/0109542 A1 Apr. 15, 2021

(30) Foreign Application Priority Data

Oct. 11, 2019 (JP) .............................. JP2019-187628

(51) Int. Cl.
*G06V 20/58* (2022.01)
*G05D 1/02* (2020.01)

(52) U.S. Cl.
CPC ........... *G05D 1/0246* (2013.01); *G06V 20/58* (2022.01)

(58) Field of Classification Search
CPC ... G06T 7/11; G06T 7/143; G06T 7/60; G06T 7/70; G06T 7/73; G06T 2207/30252; G06T 2207/30261; G06V 10/22; G06V 10/25; G06V 10/255; G06V 10/761; G06V 20/58; G05D 1/0231; G05D 1/0246
See application file for complete search history.

(56) References Cited

U.S. PATENT DOCUMENTS

2019/0103026 A1* 4/2019 Liu et al. ............... G06V 20/58

FOREIGN PATENT DOCUMENTS

JP 2019-021001 A 2/2019
WO WO-2019/161300 A1 * 8/2019 ............ B60W 50/00

* cited by examiner

*Primary Examiner* — Andrew W Johns
(74) *Attorney, Agent, or Firm* — McDermott Will & Emery LLP

(57) ABSTRACT

An image processing device includes a search processor and an image region setting unit. The search processor sets a plurality of processing regions in a frame image, and calculates a vehicle degree with respect to each of the processing regions. The vehicle degree is a degree of vehicle likeliness of an image in a relevant one of the processing regions. The image region setting unit performs, on the basis of corner coordinates of four corners of each of the processing regions, weighted average calculation weighted with the vehicle degree with respect to each of the processing regions, to calculate corner coordinates of four corners of a vehicle image region including an image of a target vehicle, in the frame image.

19 Claims, 5 Drawing Sheets

IMAGE PROCESSING DEVICE

CROSS-REFERENCE TO RELATED APPLICATIONS

This application claims priority from Japanese Patent Application No. 2019-187628 filed on Oct. 11, 2019, the entire contents of which are hereby incorporated by reference.

BACKGROUND

The disclosure relates to an image processing device that performs image processing.

Some image processing devices set image regions in a frame image and perform various processing on the basis of images in the image regions. For example, Japanese Unexamined Patent Application Publication (JP-A) No. 2019-21001 describes an object detection device. The object detection device integrates a plurality of possible face regions included in an inputted image, to set an integrated region. The object detection device makes detection as to whether or not a face is included in the integrated region.

SUMMARY

An aspect of the technology provides an image processing device including a search processor and an image region setting unit. The search processor is configured to set a plurality of processing regions in a frame image, and calculate a vehicle degree with respect to each of the plurality of the processing regions set. The vehicle degree is a degree of vehicle likeliness of an image in a relevant one of the plurality of the processing regions. The image region setting unit is configured to perform, on the basis of corner coordinates of four corners of each of the plurality of the processing regions, weighted average calculation weighted with the vehicle degree with respect to each of the plurality of the processing regions, to calculate corner coordinates of four corners of a vehicle image region in the frame image. The vehicle image region includes an image of a target vehicle.

An aspect of the technology provides an image processing device including circuitry. The circuitry is configured to set a plurality of processing regions in a frame image, and calculate a vehicle degree with respect to each of the plurality of the processing regions set. The vehicle degree is a degree of vehicle likeliness of an image in a relevant one of the plurality of the processing regions. The circuitry is configured to perform, on the basis of corner coordinates of four corners of each of the plurality of the processing regions, weighted average calculation weighted with the vehicle degree with respect to each of the plurality of the processing regions, to calculate corner coordinates of four corners of a vehicle image region in the frame image. The vehicle image region includes an image of a target vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
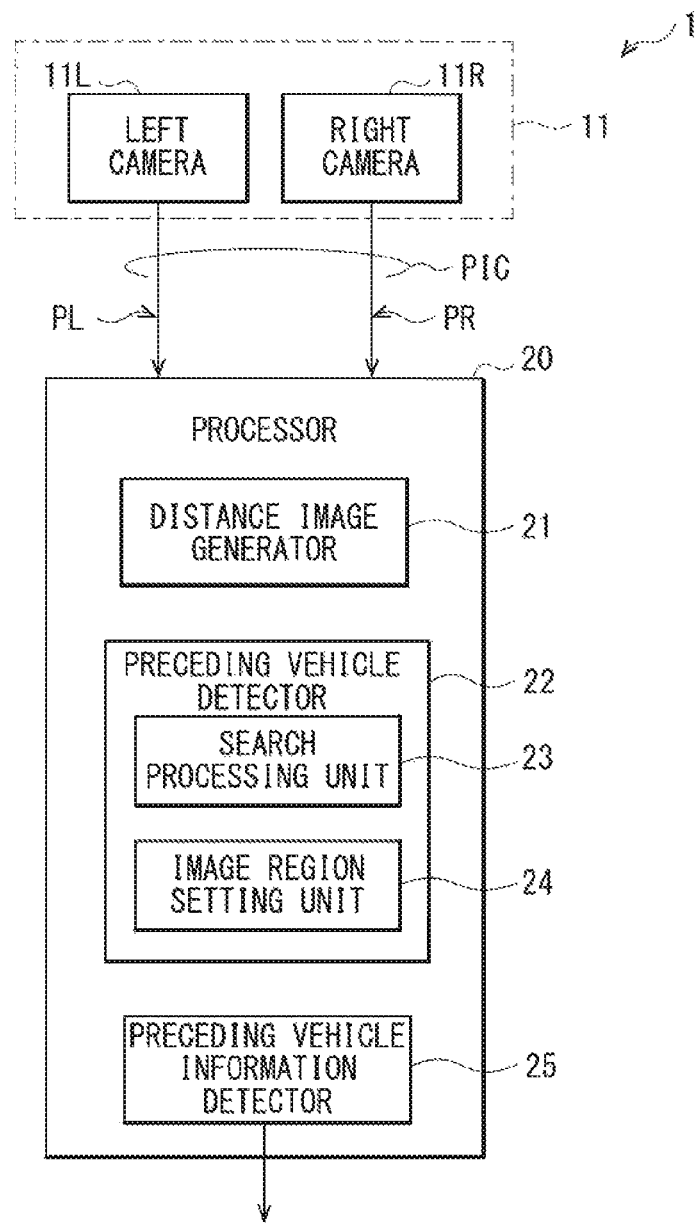
FIG. 1 is a block diagram illustrating a configuration example of an image processing device according to an embodiment of the disclosure.

For image processing devices to be mounted on, for example, vehicles, what is desired is to appropriately set, in a frame image, a vehicle image region including a target vehicle such as a preceding vehicle.

It is desirable to provide an image processing device that makes it possible to appropriately set a vehicle image region.

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Embodiments

Configuration Example

FIG. 1 illustrates a configuration example of an image processing device, e.g., an image processing device 1, according to an embodiment. The image processing device 1 may include a stereo camera 11 and a processor 20. The image processing device 1 may be mounted on a vehicle 10 such as an automobile.

The stereo camera 11 is configured to capture an image frontward of the vehicle 10, to generate a pair of images having parallax with respect to each other, e.g., a left image PL and a right image PR. The stereo camera 11 may include a left camera 11L and a right camera 11R. In this example, the left camera 11L and the right camera 11R may be disposed near an upper part of a front windshield of the vehicle 10, in vehicle interior of the vehicle 10. The left camera 11L and the right camera 11R may be spaced apart at a predetermined distance in a widthwise direction of the vehicle 10. The left camera 11L and the right camera 11R may perform imaging operation in synchronization with each other. The left camera 11L may generate the left image PL, and the right camera 11R may generate the right image PR. The left image PL and the right image PR may constitute a stereo image PIC. The stereo camera 11 may perform the imaging operation at a predetermined frame rate, e.g., 60 [fps], to generate a sequence of the stereo images PIC.

The processor 20 is configured to recognize, on the basis of the stereo image PIC supplied from the stereo camera 11, various objects around the vehicle 10, included in the left image PL and the right image PR, to detect environment information around the vehicle 10. Moreover, in a case where the processor 20 recognizes a preceding vehicle, the processor 20 may detect travel information regarding the preceding vehicle. In the vehicle 10, on the basis of, for example, information regarding the object recognized by the processor 20, for example, a travel control of the vehicle 10 may be made, or alternatively, the information regarding the object recognized may be displayed on a console monitor. The processor 20 may include, for example, a CPU (Central Processing Unit), a RAM (Random Access Memory), and a ROM (Read Only Memory). The CPU may execute programs. The RAM may temporarily hold processed data. The ROM may hold the programs. The processor 20 may include a distance image generator 21, a preceding vehicle detector 22, and a preceding vehicle information detector 25.

The distance image generator 21 is configured to perform predetermined image processing on the basis of the left image PL and the right image PR, to generate a distance image. Non-limiting examples of the predetermined image processing may include a stereo matching process and a filtering process. A pixel value of each pixel in the distance image is a depth value that indicates a distance, in three-dimensional real space, to a point corresponding each pixel.

The preceding vehicle detector 22 is configured to set, in the left image PL or the right image PR, or both, a vehicle image region R including an image of a preceding vehicle. In the following, whichever image is to be processed, out of the left image PL and the right image PR, is referred to as an image P. The preceding vehicle detector 22 includes a search processing unit 23 and an image region setting unit 24.

The search processing unit 23 is configured to search the image P for a preceding vehicle, with the use of techniques of machine learning.

Figure 2:
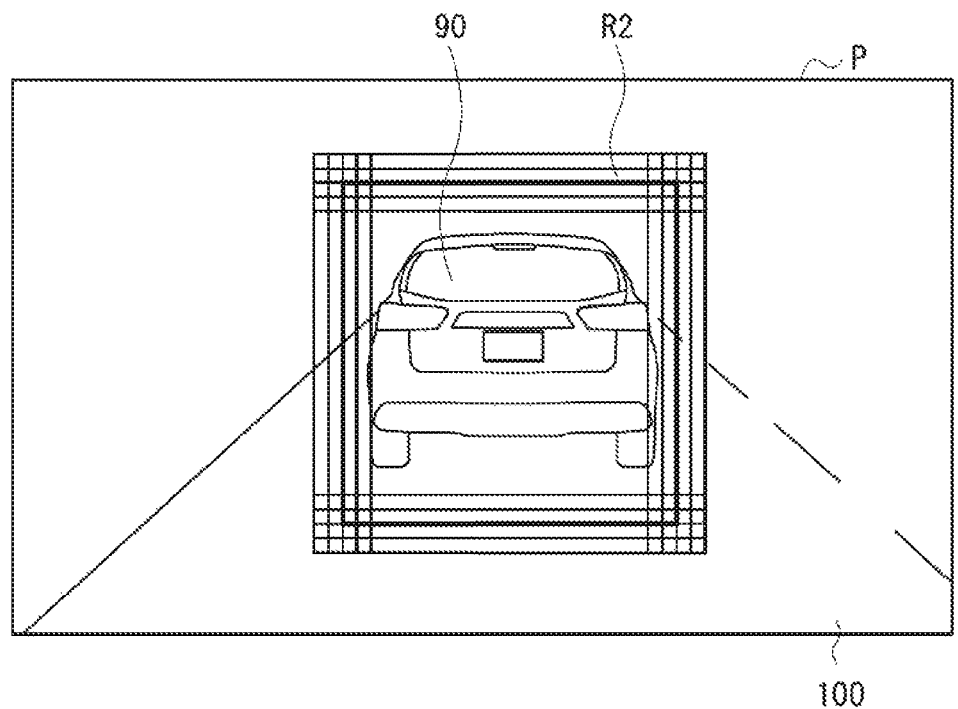
FIG. 2 is a descriptive diagram illustrating an operation example of a search processing unit illustrated in FIG. 1.

FIG. 2 schematically illustrates an operation example of the search processing unit 23. The image P may include an image of a preceding vehicle 90 traveling ahead of the vehicle 10, on a travel path 100 traveled by the vehicle 10. The search processing unit 23 may sequentially set a plurality of rectangular processing regions R2 in the image P, while gradually changing positions and sizes of the processing regions R2. At this occasion, the search processing unit 23 obtains an approximate position at which the image of the preceding vehicle 90 is supposed to be present in the current image P, on the basis of, for example, the position of the preceding vehicle 90 in the previous image P, movements of the preceding vehicle 90 obtained by the previous image P, and changes in a speed and/or changes in a yaw angle of the vehicle 10 as an own vehicle. The search processing unit 23 may sequentially set the plurality of the processing regions R2 with the relevant position as a center. Thus, the search processing unit 23 may calculate, with the use of the techniques of the machine learning, a vehicle score SC with respect to each of the processing regions R2. The vehicle score SC with respect to any one of the processing regions R2 exhibits a higher value as the image in the relevant one of the processing regions R2 is more likely to include a vehicle feature. In one example, the vehicle score SC may take a value ranging, for example, from zero (0) to several millions both inclusive. As described later, the search processing unit 23 may convert the vehicle score SC to a vehicle probability value SC2, with the use of cumulative distribution regarding the vehicle score SC. The vehicle probability value SC2 obtained on the basis of any one of the processing regions R2 is a degree of vehicle likeliness of an image in the relevant one of the processing regions R2. In this way, the search processing unit 23 may calculate the vehicle probability value SC2 with respect to each of the processing regions R2.

The image region setting unit 24 is configured to perform, on the basis of corner coordinates of four corners of each of the plurality of the processing regions R2, weighted average calculation weighted with the vehicle probability value SC2 with respect to each of the plurality of the processing regions R2, to calculate corner coordinates of four corners of the rectangular vehicle image region R including the image of the preceding vehicle 90.

Figure 3:
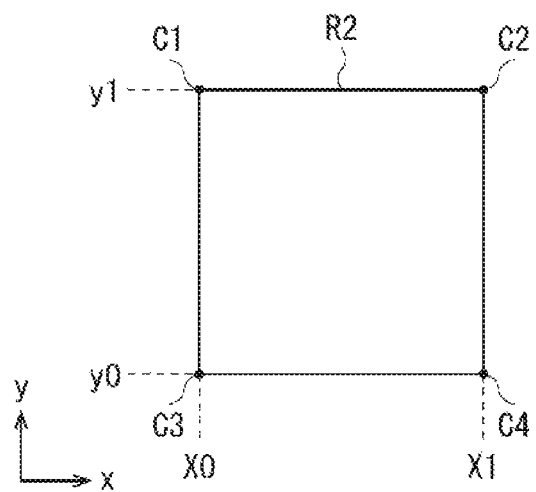
FIG. 3 illustrates an example of a processing region illustrated in FIG. 2.

FIG. 3 illustrates the single processing region R2. The reference characters "x0" and "x1" denote coordinate values in a horizontal direction, i.e., an x direction, in the image P. The reference characters "y0" and "y1" denote coordinate values in a vertical direction, i.e., a y direction, in the image P. Coordinates of an upper left corner C1 of the processing region R2 are (x0, y1). Coordinates of an upper right corner C2 are (x1, y1). Coordinates of a lower left corner C3 are (x0, y0). Coordinates of a lower right corner C4 are (x1, y0).

The image region setting unit 24 performs, on the basis of the coordinate values x0, x1, y0, and y1 of each of the plurality of the processing regions R2, e.g., the N processing regions R2, the weighted average calculation weighted with the vehicle probability value SC2 with respect to each of the plurality of the processing regions R2, e.g., the N processing regions R2, as given by the following equation. Thereby, the image region setting unit 24 calculates coordinate values Ax0, Ax1, Ay0, and Ay1 of the vehicle image region R.

$$\left.\begin{array}{l} Ax0 = \sum_{n=1}^{N} \frac{SC2(n) \times x0(n)}{SUM} \\ Ax1 = \sum_{n=1}^{N} \frac{SC2(n) \times x1(n)}{SUM} \\ Ay0 = \sum_{n=1}^{N} \frac{SC2(n) \times y0(n)}{SUM} \\ Ay1 = \sum_{n=1}^{N} \frac{SC2(n) \times y1(n)}{SUM} \end{array}\right\} \quad (EQ1)$$

Here, "SC2(n)" denotes the vehicle probability value SC2 with respect to the n-th processing region R2, "x0(n)" denotes the coordinate value x0 of the n-th processing region R2, "x1(n)" denotes the coordinate value x1 of the n-th processing region R2, "y0(n)" denotes the coordinate value y0 of the n-th processing region R2, and "y1(n)" denotes the coordinate value y1 of the n-th processing region R2. "SUM" is a sum of the vehicle probability values SC2 in the respective ones of the N processing regions R2, as given by the following equation.

$$SUM = \sum_{n=1}^{N} SC2(n) \quad (EQ2)$$

The image region setting unit 24 performs the weighted average calculation weighted with the vehicle probability value SC2, with the use of the equation EQ1, to calculate the coordinate values Ax0, Ax1, Ay0, and Ay1 of the vehicle image region R.

Figure 4:
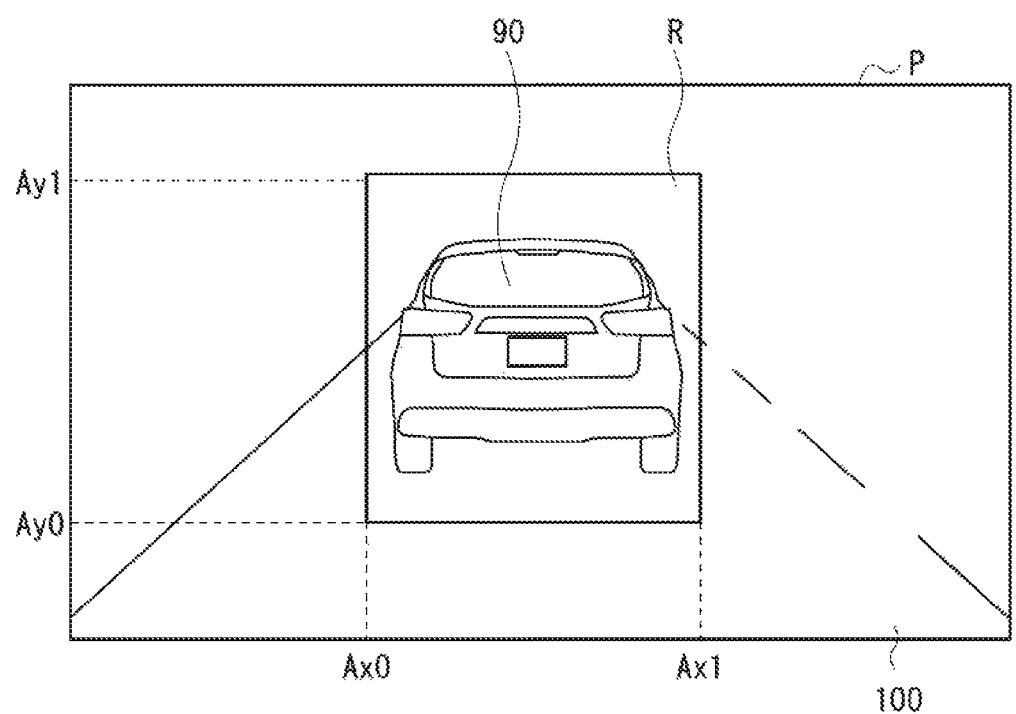
FIG. 4 illustrates an example of a vehicle image region.

FIG. 4 illustrates an example of the vehicle image region R. As illustrated in FIG. 4, the image region setting unit 24 may set the vehicle image region R in the image P, on the basis of the coordinate values Ax0, Ax1, Ay0, and Ay1 calculated.

The preceding vehicle information detector 25 is configured to detect the travel information regarding the preceding vehicle on the basis of the distance image generated by the distance image generator 21 and on the basis of a detection result of the preceding vehicle detector 22. In one example, the preceding vehicle information detector 25 may detect the travel information regarding the preceding vehicle on the basis of, for example, the distance image, a width of the vehicle image region R set by the image region setting unit 24 of the preceding vehicle detector 22, changes in the width of the vehicle image region R, a position in a vertical direction, i.e., a y direction, of the vehicle image region R in the image P, and changes in the position in the vertical direction of the vehicle image region R. Non-limiting examples of the travel information regarding the preceding vehicle may include a distance from the preceding vehicle to the vehicle 10 and a speed of the preceding vehicle.

In this way, the processor 20 recognizes the preceding vehicle traveling ahead of the vehicle 10, and make detection of the travel information regarding the preceding vehicle. Furthermore, the processor 20 may output information regarding a result of the detection.

With this configuration, in the image processing device 1, the search processing unit 23 may sequentially set the plurality of the processing regions R2 in the image P, and calculate the vehicle score SC with respect to each of the processing regions R2 with the use of the techniques of the machine learning. Furthermore, as described later, the search processing unit 23 may convert the vehicle score SC to the vehicle probability value SC2 with the use of the cumulative distribution regarding the vehicle score SC. The image region setting unit 24 performs the weighted average calculation weighted with the vehicle probability value SC2 with respect to each of the plurality of the processing regions R2, on the basis of the corner coordinates of the four corners of each of the plurality of the processing regions R2, to calculate the corner coordinates of the four corners of the vehicle image region R. Hence, in the image processing device 1, it is possible to appropriately set the vehicle image region R in the image P.

In one embodiment of the disclosure, the search processing unit 23 may serve as a "search processor". In one embodiment of the disclosure, the image region setting unit 24 may serve as an "image region setting unit". In one embodiment of the disclosure, the preceding vehicle information detector 25 may serve as a "target vehicle information detector". In one embodiment of the disclosure, the image P may serve as a "frame image". In one embodiment of the disclosure, the processing region R2 may serve as a "processing region". In one embodiment of the disclosure, the vehicle image region R may serve as a "vehicle image region". In one embodiment of the disclosure, the vehicle score SC may serve as a "vehicle score". In one embodiment of the disclosure, the vehicle probability value SC2 may serve as a "vehicle degree".

[Operation and Workings]

Description now moves on to operation and workings of the image processing device 1 according to the embodiment.

(Summary of Overall Operation)

First, summary of overall operation of the image processing device 1 is described with reference to FIG. 1. The stereo camera 11 captures an image frontward of the vehicle 10, to generate the stereo image PIC including the left image PL and the right image PR. On the basis of the stereo camera PIC supplied from the stereo camera 11, the processor 20 recognizes various objects around the vehicle 10, included in the left image PL and the right image PR, to detect the environment information around the vehicle 10. Moreover, in the case where the processor 20 recognizes a preceding vehicle, the processor 20 detects the travel information regarding the relevant preceding vehicle. In one example, in the processor 20, the distance image generator 21 may perform, on the basis of the left image PL and the right image PR, the predetermined image processing, to generate the distance image. Non-limiting examples of the predetermined image processing may include the stereo matching process and the filtering process. The preceding vehicle detector 22 may set the vehicle image region R including the image of the preceding vehicle, in the image P, i.e., whichever of the left image PL and the right image PR is to be processed. The preceding vehicle information detector 25 may detect the travel information regarding the preceding vehicle on the basis of the distance image generated by the distance image generator 21 and on the basis of the result of the detection of the preceding vehicle detector 22.

(Detailed Operation)

In the preceding vehicle detector 22, the search processing unit 23 may sequentially set the plurality of the processing regions R2 in the image P, and calculate the vehicle score SC with respect to each of the processing regions R2 with the use of the techniques of the machine learning. Furthermore, the search processing unit 23 may convert the vehicle score SC to the vehicle probability value SC2 with the use of the cumulative distribution regarding the vehicle score SC. The image region setting unit 24 performs the weighted average calculation weighted with the vehicle probability value SC2 with respect to each of the plurality of the processing regions R2 on the basis of the corner coordinates of the four corners of each of the plurality of the processing regions R2, to calculate the corner coordinates of the four corners of the vehicle image region R including the image of the preceding vehicle. In the following, this operation is described in detail.

As illustrated in FIG. 2, the search processing unit 23 may sequentially set the plurality of the processing regions R2 in the image P, while gradually changing the positions and the sizes of the processing regions R2. Moreover, the search processing unit 23 may calculate the vehicle score SC with respect to each of the processing regions R2 with the use of the techniques of the machine learning. The vehicle score SC exhibits a higher value as the image in the processing region R2 is more likely to include a vehicle feature. In one example, the vehicle score SC may take the value ranging from zero (0) to several millions both inclusive. Furthermore, the search processing unit 23 may convert the vehicle score SC to the vehicle probability value SC2 with the use of the cumulative distribution regarding the vehicle score SC.

Figure 5:
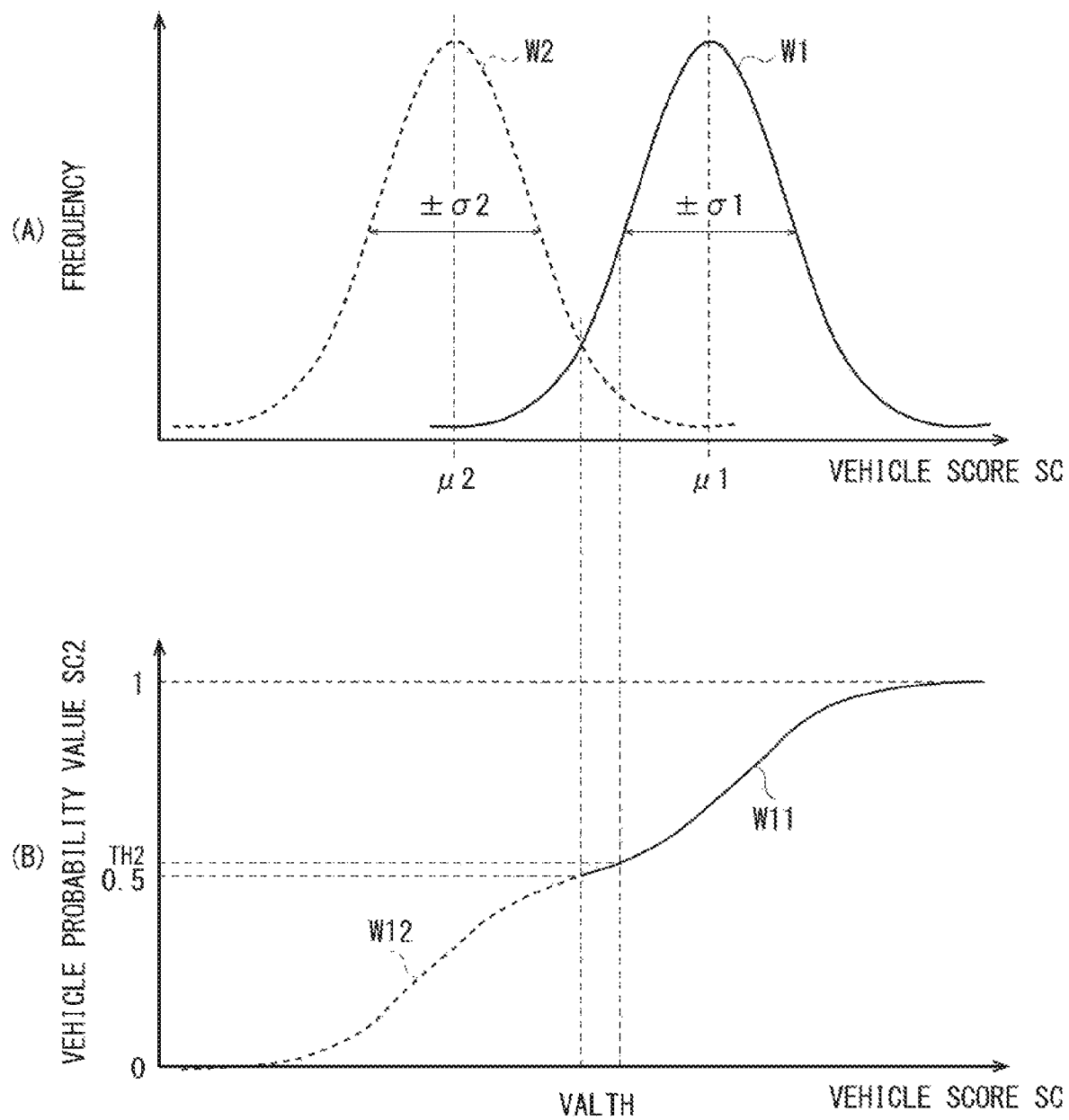
FIG. 5 is another descriptive diagram illustrating the operation example of the search processing unit illustrated in FIG. 1.

FIG. 5 illustrates a concept of operation of the conversion from the vehicle score SC to the vehicle probability value SC2. Part (A) of FIG. 5 illustrates distribution of the vehicle score SC in a certain example of the image P. Part (B) of FIG. 5 illustrates the cumulative distribution regarding the vehicle score SC. In part (A) of FIG. 5, a horizontal axis denotes the vehicle score SC, and a vertical axis denotes frequency. In part (B) of FIG. 5, a horizontal axis denotes the vehicle score SC, and a vertical axis denotes the vehicle probability value SC2.

As illustrated in part (A) of FIG. 5, in this example, the distribution of the vehicle score SC includes two distributions W1 and W2. The distribution W1 is the distribution of the vehicle score SC in whichever of the plurality of the processing regions R2 includes an entirety of the image of the preceding vehicle 90, in the image P as illustrated in, for example, FIG. 2. The distribution W2 is the distribution of the vehicle score SC in, for example, whichever of the plurality of the processing regions R2 includes solely part of the image of the preceding vehicle 90, or whichever of the plurality of the processing regions R2 does not include the image of the preceding vehicle 90. The vehicle score SC in the distribution W1 is relatively high, while the vehicle score SC in the distribution W2 is relatively low. In other words, whichever of the plurality of the processing regions R2 includes solely part of the image of the preceding vehicle 90, or whichever of the plurality of the processing regions R2 does not include the image of the preceding vehicle 90 may possibly have the high vehicle score SC in a case where they happen to include an image that looks like a vehicle. But the vehicle score SC in such a case may be possibly lower than the vehicle score SC obtained in whichever of the plurality of the processing regions R2 includes the entirety of the image of the preceding vehicle 90. In this example, the distribution W1 is represented by a normal distribution having an average value $\mu1$ and a standard deviation $\sigma2$, and the distribution W2 is represented by a normal distribution having an average value $\mu2$ and a standard deviation $\sigma2$.

The cumulative distribution illustrated in part (B) of FIG. 5 is a cumulative distribution based on a total distribution W, i.e., a sum of the two distributions W1 and W2 illustrated in part (A) of FIG. 5. In one example, a value, i.e., the vehicle probability value SC2, at a certain value of the vehicle score SC in the cumulative distribution illustrated in part (B) of FIG. 5 is obtained by integrating values equal to or smaller than the relevant vehicle score SC in the total distribution W, i.e., the sum of the two distributions W1 and W2 illustrated in part (A) of FIG. 5. This cumulative distribution is normalized. The cumulative distribution may include a distribution W11 and a distribution W12. The distribution W11 corresponds to the distribution W1 illustrated in part (A) of FIG. 5, and the distribution W12 corresponds to the distribution W2 illustrated in part (A) of FIG. 5. The vehicle probability value SC2 is close to "0" (zero) in a case where the vehicle score SC is low. The vehicle probability value SC2 becomes greater as the vehicle score SC becomes higher. In a case where the vehicle score SC is sufficiently high, the vehicle probability value SC2 comes close to "1". In other words, as the vehicle score SC is higher, the vehicle likeliness becomes higher, and the vehicle probability value SC2 comes asymptotically close to "1". The search processing unit 23 may convert the vehicle score SC to the vehicle probability value SC2 with the use of the cumulative distribution as illustrated in part (B) of FIG. 5.

The distribution characteristic illustrated in FIG. 5 is exemplary, and the distribution of the vehicle score SC may change with the image P. Accordingly, preparations may be made in advance, for the average values $\mu1$ and $\mu2$ and the standard deviations $\sigma1$ and $\sigma2$ related to the two distributions W1 and W2 by, for example, the machine learning with the use of various samples of the image P. The search processing unit 23 may hold the average values $\mu1$ and $\mu2$ and the standard deviations $\sigma1$ and $\sigma2$ thus prepared. In a case where the vehicle score SC is equal to or higher than a predetermined value VAL, the search processing unit 23 may calculate the vehicle probability value SC2 with the use of the following equation EQ3. In a case where the vehicle score SC is lower than the predetermined value VAL, the search processing unit 23 may calculate the vehicle probability value SC2 with the use of the following equation EQ4.

$$SC2 = \frac{1}{2} + \frac{1}{2} \times \left[\frac{1}{2}\left\{1 + erf\left(\frac{SC - \mu1}{\sqrt{2\sigma1^2}}\right)\right\}\right] \quad (EQ3)$$

$$SC2 = \frac{1}{2} \times \left[\frac{1}{2}\left\{1 + erf\left(\frac{SC - \mu2}{\sqrt{2\sigma2^2}}\right)\right\}\right] \quad (EQ4)$$

Here, "erf" denotes an error function. Mathematical expressions in the square brackets [ ] in the equations EQ3 and EQ4 are cumulative distribution functions. The predetermined value VAL may be set at, for example, the vehicle score SC at which the value for the distribution W1 and the value for the distribution W2 coincide with each other, as illustrated in FIG. 5. In the case where the vehicle score SC is equal to or higher than the predetermined value VAL, making calculation with the use of the equation EQ3 allows the vehicle probability value SC2 to take a value from "0.5" to "1" both inclusive, in this example. In the case where the vehicle score SC is lower than the predetermined value VAL, making calculation with the use of the equation EQ4 allows the vehicle probability value SC2 to take a value from "0" to "0.5" both inclusive, in this example. In this way, the search processing unit 23 may convert the vehicle score SC with respect to each of the plurality of the processing regions R2 to the vehicle probability value SC2 with the use of the equations EQ3 and EQ4. Here, in one embodiment of the disclosure, the average value $\mu1$ may serve as an "average value". In one embodiment of the disclosure, the standard deviation al may serve as a "variance value".

It is to be noted that in this example, as illustrated in part (A) of FIG. 5, the distribution W1 and the distribution W2 are assumed to be almost the same. Accordingly, an integral value of the distribution W1 and an integral value of the distribution W2 are also almost the same, and therefore, in the cumulative distribution illustrated in part (B) of FIG. 5, the vehicle probability value SC2 with the vehicle score SC at the predetermined value VAL is "0.5". However, actually, the integral value of the distribution W1 and the integral value of the distribution W2 are not almost the same. Therefore, in the cumulative distribution illustrated in part (B) of FIG. 5, the vehicle probability value SC2 with the vehicle score SC at a threshold TH may sometimes deviate from "0.5". For example, in a case where the integral value of the distribution W2 is smaller than the integral value of the distribution W1, in the cumulative distribution illustrated in part (B) of FIG. 5, the vehicle probability value SC2 with the vehicle score SC at the predetermined value VAL may be a value lower than "0.5". Moreover, in a case where the integral value of the distribution W2 is greater than the integral value of the distribution W1, in the cumulative distribution illustrated in part (B) of FIG. 5, the vehicle probability value SC2 with the vehicle score SC at the predetermined value VAL may be a value higher than "0.5". In such cases, the equations EQ3 and EQ4 may be corrected in accordance with these characteristics. This makes it possible for the search processing unit 23 to make calculation with the use of the corrected equations, to convert the vehicle score SC to the vehicle probability value SC2.

The image region setting unit 24 may perform the weighted average calculation weighted with the vehicle probability value SC2 with respect to each of the plurality of the processing regions R2, on the basis of the corner coordinates of the four corners of each of whichever of the plurality of the processing regions R2 set by the search processing unit 23 has the vehicle probability value SC2 equal to or greater than a threshold TH2. Thereby, the image region setting unit 24 may calculate the corner coordinates of the four corners of the vehicle image region R. In this example, as illustrated in part (B) of FIG. 5, the threshold TH2 is what is obtained by converting the threshold TH for the vehicle score SC to a threshold for the vehicle probability value SC2. Setting of the threshold TH may be provided to allow an error rate to be equal to or lower than a predetermined value. The error rate is a value obtained by dividing an integral value of the threshold TH or greater in the distribution W2, by an integral value of the threshold TH or greater in the distribution W1, in part (A) of FIG. 5. The image region setting unit 24 may calculate the corner coordinates of the four corners of the vehicle image region R on the basis of the corner coordinates of the four corners of each of whichever of the plurality of the processing regions R2 has the vehicle probability value SC2 equal to or greater than the threshold TH2. Hence, it is possible for the image region setting unit 24 to set the vehicle image region R on the basis of whichever of the plurality of the processing regions R2 includes the entirety of the image of the preceding vehicle 90, without considering whichever of the plurality of the processing regions R2 includes solely part of the image of the preceding vehicle 90, or whichever of the plurality of the processing regions R2 does not include the image of the preceding vehicle 90.

In one example, the image region setting unit 24 may make the weighted average calculation weighted with the vehicle probability value SC2 with respect to each of the N processing regions R2, as given by the equation EQ1, on the basis of the coordinate values x0, x1, y0, and y1 in each of the N processing regions R2 having the vehicle probability value SC2 equal to or greater than the threshold TH2. Thereby, the image region setting unit 24 may calculate the coordinate values Ax0, Ax1, Ay0, and Ay1 of the vehicle image region R. The image region setting unit 24 may set the vehicle image region R in the image P, as illustrated in FIG. 4, on the basis of the coordinate values Ax0, Ax1, Ay0, and Ay1 calculated.

The preceding vehicle information detector 25 detects the travel information regarding the preceding vehicle on the basis of the distance image generated by the distance image generator 21, and on the basis of the result of the detection of the preceding vehicle detector 22 thus obtained.

As described, in the image processing device 1, the image region setting unit 24 makes the weighted average calculation weighted with the vehicle probability value SC2 in each of the plurality of the processing regions R2 on the basis of the corner coordinates of the four corners of each of the plurality of the processing regions R2, to calculate the corner coordinates of the four corners of the vehicle image region R. Hence, it is possible to appropriately set the vehicle image region R.

If whichever of the plurality of the processing regions R2 gains the highest vehicle score SC is adopted as the vehicle image region R, there would be cases where the vehicle image region R is not appropriately set. For example, in a case where one of the processing regions R2 does not include an image of a vehicle but happens to include an image that looks like a vehicle, the vehicle score SC may possibly become high. If such a processing region R2 has the highest vehicle score SC, the processing region R2 that does not include an image of a vehicle would be adopted as the vehicle image region R. In this case, the preceding vehicle information detector 25 would detect the travel information regarding the preceding vehicle on the basis of this vehicle image region R. This contributes to lowered precision of the travel information.

In contrast, in the image processing device 1, the weighted average calculation weighted with the vehicle probability value SC2 with respect to each of the plurality of the processing regions R2 is made, to calculate the corner coordinates of the four corners of the vehicle image region R. In this way, the corner coordinates of the four corners of the vehicle image region R are calculated in consideration of not only whichever of the plurality of the processing regions R2 does not include any image of a vehicle but has the highest vehicle score SC, but also many of the plurality of the processing regions R2 that include an image of a vehicle. As a result, in the image processing device 1, it is possible to stabilize the vehicle image region R, leading to appropriate setting of the vehicle image region R.

Moreover, in the image processing device 1, the search processing unit 23 may convert the vehicle score SC to the vehicle probability value SC2 with the use of the cumulative distribution regarding the vehicle score SC. The image region setting unit 24 may perform the weighted average calculation weighted with the vehicle probability value SC2, to set the vehicle image region R. Hence, it is possible to appropriately set the vehicle image region R.

If the weighted average calculation weighted with the vehicle score SC itself is made, to set vehicle image region R, there would be cases where the vehicle image region R is not appropriately set. For example, in the case where one of the processing regions R2 does not include an image of a vehicle but happens to include an image that looks like a vehicle, the vehicle score SC may possibly become extremely higher than the vehicle scores SC of the other processing regions R2. For example, in a case where the preceding vehicle is covered with mud, the vehicle score SC of whichever processing region R2 includes the image of the relevant preceding vehicle may be not so high, while the vehicle score SC of whichever processing region R2 does not include the image of the preceding vehicle may happen to become extremely high. In this case, making the weighted average calculation weighted with the vehicle score SC would cause whichever processing region R2 does not include the image of the vehicle to be excessively weighted. Accordingly, the coordinate values x0, x1, y0, and y1 of whichever processing region R2 does not include the image of the vehicle become dominant, and these coordinate values may influence the coordinate values Ax0, Ax1, Ay0, and Ay1 of the vehicle image region R.

In contrast, in the image processing device 1, the vehicle score SC may be converted to the vehicle probability value SC2 with the use of the cumulative distribution regarding the vehicle score SC. The weighted average calculation weighted with the vehicle probability value SC2 may be made, to set the vehicle image region R. In this way, for example, the extremely high vehicle score SC is converted to the vehicle probability value SC2 having the value of almost "1". This alleviates the influence of whichever processing region R2 has such a vehicle score SC but does not include the image of the vehicle. As a result, in the image processing device 1, it is possible to stabilize the vehicle image region R, leading to the appropriate setting of the vehicle image region R.

As described, in the image processing device 1, it is possible to appropriately set the vehicle image region R. Therefore, in the image processing device 1, it is possible to precisely detect the travel information regarding the preceding vehicle on the basis of the vehicle image region R. As a result, for example, in a case where the travel control of the vehicle 10 as the own vehicle is made on the basis of the travel information, it is possible to make the travel control precisely. Moreover, in a case where the travel information regarding the preceding vehicle is displayed on the console monitor, it is possible to notify a driver of precise information.

[Effects]

As described, in the embodiment, the weighted average calculation weighted with the vehicle probability value with respect to each of the plurality of the processing regions is made, on the basis of the corner coordinates of the four corners of each of the plurality of the processing regions, to calculate the corner coordinates of the four corners of the vehicle image region. Hence, it is possible to appropriately set the vehicle image region.

In the embodiment, the vehicle score may be converted to the vehicle probability value with the use of the cumulative distribution of the vehicle score. The weighted average calculation weighted with the vehicle probability value may be made, to set the vehicle image region. Hence, it is possible to appropriately set the vehicle image region.

[Modification Examples]

In the forgoing embodiment, the image region setting unit 24 calculates the corner coordinates of the four corners of the vehicle image region R on the basis of the corner coordinates of the four corners of each of whichever of the plurality of the processing regions R2 set by the search processing unit 23 has the vehicle probability value SC2 equal to or greater than the threshold TH2. For example, the threshold TH2 of the vehicle probability value SC2 may be changeable. In the following, this example is described in detail.

Figure 6:
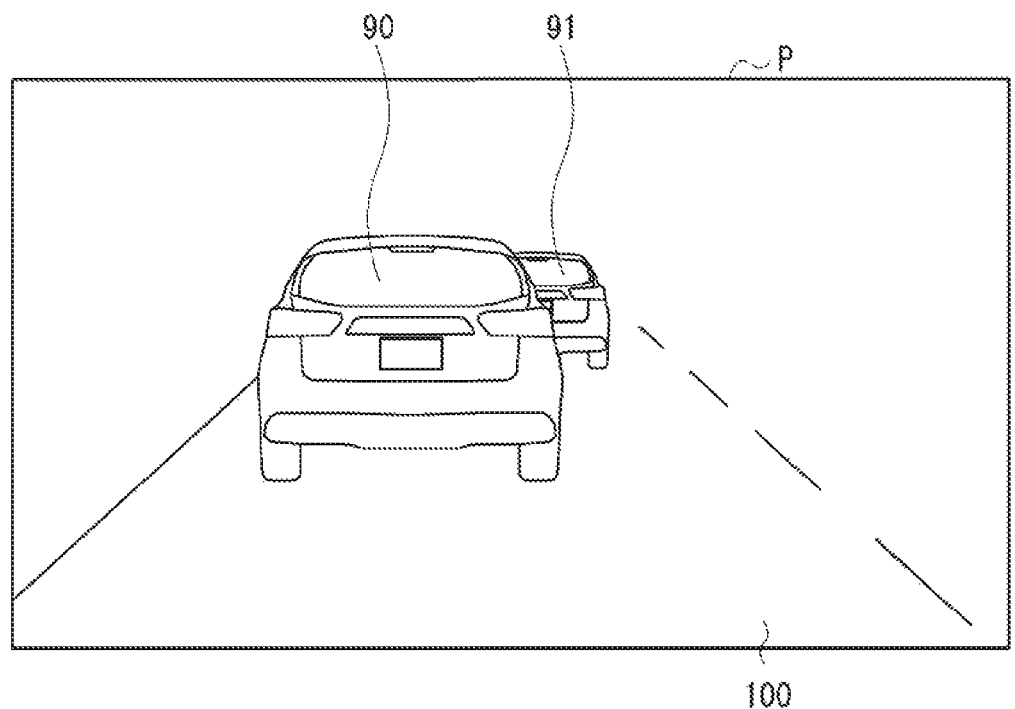
FIG. 6 is an image diagram illustrating an example of an image.

FIG. 6 illustrates an example of the image P. As illustrated in FIG. 6, in a case where another preceding vehicle 91 is traveling ahead of the preceding vehicle 90, part of the preceding vehicle 91 may be sometimes hidden by the preceding vehicle 90.

In such an image P, the search processing unit 23 may sequentially set the plurality of the processing regions R2 while gradually changing the positions and the sizes of the processing regions R2. Thus, the search processing unit 23 may calculate the vehicle score SC with respect to each of the processing regions R2 with the use of the techniques of the machine learning. For example, the vehicle score SC with respect to whichever of the plurality of the processing regions R2 includes the entirety of the image of the preceding vehicle 90 becomes a relatively high value A. The vehicle score SC with respect to whichever of the plurality of the processing regions R2 includes part of the image of the preceding vehicle 90 may be a slightly lower value B than the value A.

In such a case, the image region setting unit 24 may change the threshold TH2, to set the vehicle image region R on the basis of whichever of the plurality of the processing regions R2 includes the entirety of the image of the preceding vehicle 90, without considering whichever of the plurality of the processing regions R2 includes the image of the preceding vehicle 91.

Figure 7:
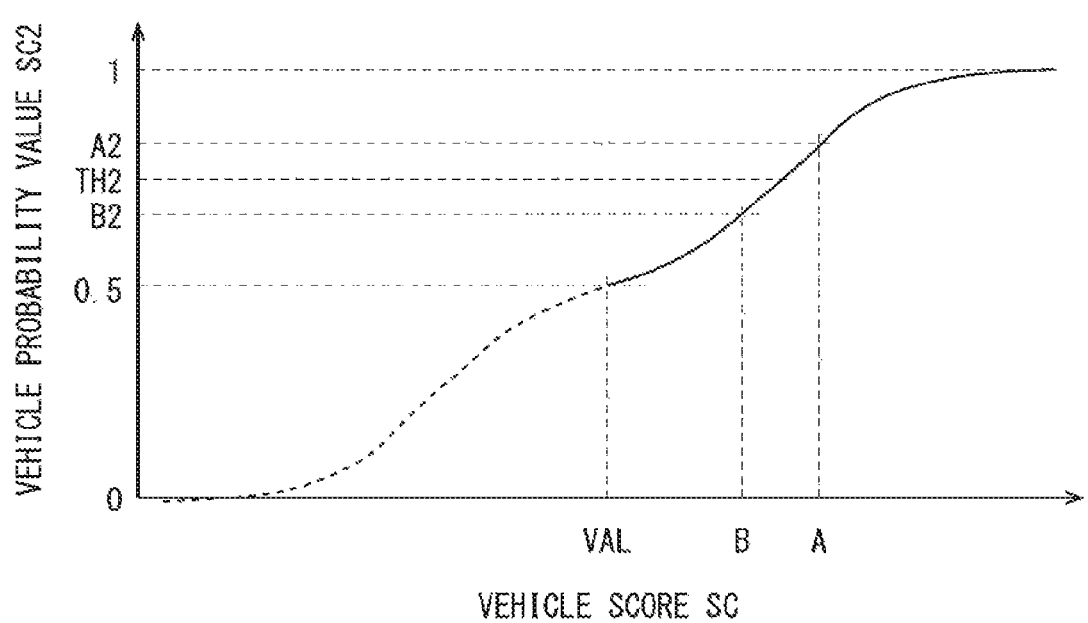
FIG. 7 is a descriptive diagram illustrating an operation example of the search processing unit according to a modification example.

FIG. 7 illustrates a setting example of the threshold TH2. The threshold TH2 may be set at a value between a value A2 and a value B2. The value A2 is obtained by converting, to the vehicle probability value SC2, a value A of the vehicle score SC with respect to whichever of the plurality of the processing regions R2 includes the entirety of the image of the preceding vehicle 90. The value B2 is obtained by converting, to the vehicle probability value SC2, a value B of the vehicle score SC with respect to whichever of the plurality of the processing regions R2 includes part of the image of the preceding vehicle 91. The image region setting unit 24 may set the threshold TH2 on the basis of, for example, an average value of the vehicle scores SC with respect to the plurality of the processing regions R2.

The image region setting unit 24 may calculate the corner coordinates of the four corners of the vehicle image region R on the basis of the corner coordinates of the four corners of each of whichever of the plurality of the processing regions R2 set by the search processing unit 23 has the vehicle probability value SC2 equal to or greater than the threshold TH2. Hence, it is possible for the image region setting unit 24 to set the vehicle image region R on the basis of whichever of the plurality of the processing regions R2 includes the entirety of the image of the preceding vehicle 90, without considering whichever of the plurality of the processing regions R2 includes part of the image of the preceding vehicle 91.

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, in the forgoing embodiments, the stereo camera 11 captures the image frontward of the vehicle 10 to detect a preceding vehicle, but this is non-limiting. The stereo camera 11 may capture an image rearward of the vehicle 10, to detect a following vehicle.

It is to be noted that the effects described in the specification are by no means limitative but explanatory or exemplary. The technology according to the disclosure may produce other effects, together with the forgoing effects, or instead of the forgoing effects.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 20 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An image processing device, comprising:
   a search processor configured to set a plurality of processing regions in a frame image, and calculate a vehicle degree with respect to each of the plurality of the processing regions set, the vehicle degree being a degree of vehicle likeliness of an image in a relevant one of the plurality of the processing regions; and
   an image region setting unit configured to perform, on a basis of corner coordinates of four corners of each of the plurality of the processing regions, weighted average calculation weighted with the vehicle degree with respect to each of the plurality of the processing regions, to calculate corner coordinates of four corners of a vehicle image region in the frame image, the vehicle image region including an image of a target vehicle.

2. The image processing device according to claim 1, wherein
   the search processor is configured to
      calculate a vehicle score with respect to each of the plurality of the processing regions set, the vehicle score having a higher value as the image in the relevant one of the plurality of the processing regions is more likely to include a vehicle feature, and
      convert the vehicle score to the vehicle degree, using cumulative distribution regarding the vehicle score.

3. The image processing device according to claim 2, wherein
   the search processor is configured to calculate the cumulative distribution on a basis of a predetermined average value and a predetermined variance value regarding the vehicle score.

4. The image processing device according to claim 1, wherein
   the image region setting unit is configured to perform, on a basis of corner coordinates of four corners of each of two or more processing regions out of the plurality of the processing regions, the weighted average calculation weighted with the vehicle degree with respect to each of the two or more processing regions, to calculate the corner coordinates of the four corners of the vehicle image region.

5. The image processing device according to claim 2, wherein
   the image region setting unit is configured to perform, on a basis of corner coordinates of four corners of each of two or more processing regions out of the plurality of the processing regions, the weighted average calculation weighted with the vehicle degree with respect to each of the two or more processing regions, to calculate the corner coordinates of the four corners of the vehicle image region.

6. The image processing device according to claim 3, wherein
   the image region setting unit is configured to perform, on a basis of corner coordinates of four corners of each of two or more processing regions out of the plurality of the processing regions, the weighted average calculation weighted with the vehicle degree with respect to each of the two or more processing regions, to calculate the corner coordinates of the four corners of the vehicle image region.

7. The image processing device according to claim 4, wherein
   the two or more processing regions are each a region having the vehicle degree greater than a threshold.

8. The image processing device according to claim 5, wherein
   the two or more processing regions are each a region having the vehicle degree greater than a threshold.

9. The image processing device according to claim 6, wherein
   the two or more processing regions are each a region having the vehicle degree greater than a threshold.

10. The image processing device according to claim 1, further comprising a target vehicle information detector configured to detect travel information regarding the target vehicle on a basis of a position and a size of the vehicle image region in the frame image.

11. The image processing device according to claim 2, further comprising a target vehicle information detector configured to detect travel information regarding the target vehicle on a basis of a position and a size of the vehicle image region in the frame image.

12. The image processing device according to claim 3, further comprising a target vehicle information detector configured to detect travel information regarding the target vehicle on a basis of a position and a size of the vehicle image region in the frame image.

13. The image processing device according to claim 4, further comprising a target vehicle information detector configured to detect travel information regarding the target vehicle on a basis of a position and a size of the vehicle image region in the frame image.

14. The image processing device according to claim 5, further comprising a target vehicle information detector configured to detect travel information regarding the target vehicle on a basis of a position and a size of the vehicle image region in the frame image.

15. The image processing device according to claim 6, further comprising a target vehicle information detector configured to detect travel information regarding the target vehicle on a basis of a position and a size of the vehicle image region in the frame image.

16. The image processing device according to claim 7, further comprising a target vehicle information detector configured to detect travel information regarding the target vehicle on a basis of a position and a size of the vehicle image region in the frame image.

17. The image processing device according to claim 8, further comprising a target vehicle information detector configured to detect travel information regarding the target vehicle on a basis of a position and a size of the vehicle image region in the frame image.

18. The image processing device according to claim 9, further comprising a target vehicle information detector configured to detect travel information regarding the target vehicle on a basis of a position and a size of the vehicle image region in the frame image.

19. An image processing device, comprising
    circuitry configured to:
       set a plurality of processing regions in a frame image, and calculate a vehicle degree with respect to each of the plurality of the processing regions set, the vehicle degree being a degree of vehicle likeliness of an image in a relevant one of the plurality of the processing regions; and perform, on a basis of corner coordinates of four corners of each of the plurality of the processing regions, weighted average calculation weighted with the vehicle degree with respect to each of the plurality of the processing regions, to calculate corner coordinates of four corners of a vehicle image region in the frame image, the vehicle image region including an image of a target vehicle.

\* \* \* \* \*